United States Patent [19]

Peppers et al.

[11] Patent Number: 4,947,449
[45] Date of Patent: Aug. 7, 1990

[54] APPARATUS FOR SIMULTANEOUSLY EXTRACTING VARIOUS TYPES OF PROJECTION FEATURES OF AN IMAGE

[75] Inventors: Norman A. Peppers, Belmont; James R. Young, Palo Alto, both of Calif.; Kazuo Katsuki, Osaka, Japan

[73] Assignee: Nippon Sheet Glass Co., Ltd., Osaka, Japan

[21] Appl. No.: 342,690

[22] Filed: Apr. 19, 1989

Related U.S. Application Data

[63] Continuation of Ser. No. 33,007, Mar. 31, 1987, abandoned.

[51] Int. Cl.⁵ .............................................. G06K 9/20
[52] U.S. Cl. ................................. 382/65; 250/578.1; 282/28; 282/67; 282/68
[58] Field of Search ..................... 382/28, 32, 65, 67, 382/68, 18; 358/293; 250/578

[56] References Cited

U.S. PATENT DOCUMENTS

| | | | |
|---|---|---|---|
| 3,074,634 | 1/1963 | Gamo | 382/65 |
| 3,244,889 | 4/1966 | Preston et al. | 382/68 |
| 3,252,140 | 5/1966 | Lemay et al. | 382/32 |
| 3,264,611 | 8/1966 | Lohmann | 382/65 |
| 3,461,301 | 8/1969 | Fitzmaurice et al. | 372/32 |
| 3,506,837 | 4/1970 | Majima | 382/68 |
| 3,534,333 | 10/1970 | Kerper, Jr. | 382/65 |
| 3,550,119 | 12/1970 | Rabinow | 382/32 |
| 3,602,887 | 8/1971 | Chow | 382/30 |
| 3,869,697 | 3/1975 | Kawasaki | 382/28 |
| 4,005,285 | 1/1977 | Price | 250/578 |
| 4,371,866 | 2/1983 | Smith | 382/65 |
| 4,656,517 | 4/1987 | Shida et al. | 250/578 |

Primary Examiner—Leo H. Boudreau
Assistant Examiner—Joseph Mancuso
Attorney, Agent, or Firm—Woodcock, Washburn, Kurtz, Mackiewicz & Norris

[57] ABSTRACT

In an apparatus for simultaneously extracting various types of projection features of an image such as a character or any other figure, an image whose projection features are to be extracted is optically multiplied by a multiplier (4) to form a plurality of optical image each having a substantially identical shape, and the plurality of images are independently supplied to a plurality of detecting means (5A) to simultaneously obtain the various types of projection features. The arrangement of the apparatus can be simplified at low cost, and at the same time, parallel extraction of the projection features can be achieved within a short period of time. Various types of projection features can be simply obtained as needed.

3 Claims, 2 Drawing Sheets

APPARATUS FOR SIMULTANEOUSLY EXTRACTING VARIOUS TYPES OF PROJECTION FEATURES OF AN IMAGE

This is a continuation of application Ser. No. 033,007, filed Mar. 31, 1987 now abandoned.

BACKGROUND OF THE INVENTION

1. Field of the Invention:

The present invention relates to an apparatus for simultaneously extracting various types of projection features of an image such as a character or any other figure, the apparatus being suitably applied to an image recognition apparatus such as an OCR (Optical Character Reader).

2. Description of the Prior Art:

A conventional image recognition apparatus for recognizing an image such as a character and any other figure is designed to perform processing utilizing mainly electronic techniques.

A conventional image recognition apparatus will be briefly described. An image pattern subjected to image recognition and written on an original by printing or the like is focused by an optical lens on a light-receiving surface of an image sensor comprising a CCD or a MOS sensor. A multi-value digital signal as image information is output from the image sensor and is binarized by a proper threshold value (if there are a plurality of multiple threshold values, multi-value conversion different from that described above is performed). The binarized signal is stored in a memory. The binarized image information is subjected to preprocessing for shaping the image, as needed. The preprocessed image information is stored in the above memory or another memory. Preprocessing includes noise reduction processing and normalization processing for positions, sizes, inclinations, and widths.

Subsequently, a projection feature required for discriminating an image is extracted by a projection-processing section from the image information stored in the memory.

In order to project an image on a given axis (e.g., the X-axis), the memory which stores the image information is scanned in a direction (e.g., the Y-axis) having a predetermined relationship with the given axis, and the image information is read out in time series or simultaneous time series. The readout image information is transferred to the projection-processing section. Pieces of the transferred image information are sequentially measured. Electric amounts sequentially obtained by such measurements are stored at predetermined positions in the memory or another memory corresponding to the given axis. A curve of an intensity distribution obtained by extracting projection features on the given axis is calculated on the basis of the stored electrical amounts.

The projection features of the image are normally extracted on a plurality of given axes, and thus a plurality of intensity distribution curves can be obtained about same information. The plurality of projection features of the image which are represented by these intensity distribution curves are compared with projection features of a prestored standard pattern, thereby discriminating the image.

In the image recognition apparatus described above, projection processing must be performed on a large number of axes about same image information in order to increase an image recognition rate, thereby extracting different types of projection features. In order to project an image on a large number of axes, one of the following procedures is required:

(1) The above-mentioned projection processing is repeated a number of times in a single projection-processing section; or (2) A large number of projection-processing sections each having an independent memory for projection processing are prepared, and at the same time, pieces of image information read out from the memories for storing image information are transferred to the projection-processing sections. The above-mentioned projection processing operations are simultaneously performed in the large number of projection-processing sections.

In the conventional image recognition apparatus described above, processing is performed primarily employing electronic techniques. Processing time is inevitably prolonged as follows:

In order to increase the image recognition rate, projection features on a large number of axes must be extracted. However, in said procedure (1), the memory which stores the image information is scanned in a predetermined direction to sequentially read out the pieces of image information from the memory. These pieces of information are transferred to the projection-processing section and are measured sequentially as the electrical amounts in the projection-processing section. The intensity distribution curve must then be obtained on the basis of the electrical amounts obtained by such measuring. In addition, the above operation must be repeated a number of times and then the projection processing time will be prolonged, thus degrading efficiency of projection.

In said procedure (2), the intensity distribution curves are also obtained after the image information is transferred and measured. The projection processing time is prolonged, although said procedure (2) is not worse than said procedure (1). In this case a large number of projection-processing sections are required, and thus the overall system configuration is undesirably complicated.

In the conventional image recognition apparatus described above, if nonlinear projection processing such as circumferential or radial projection (to be described later) is performed, individual linear scanning start and end positions along a predetermined direction must be determined by a special function, and the range of a nonlinear pattern to be projected must be determined by a set of a large number of linear scanning cycles. Therefore, it is not easy to perform nonlinear projection of image information and thus it is very difficult to increase the image recognition rate.

SUMMARY OF THE INVENTION

It is, therefore, an object of the present invention to provide an apparatus for simultaneously extracting projection features of an image, wherein optical simultaneous processing is used to extract projection features of an image with a simple arrangement, thereby simultaneously extracting various types of projection features at high speed.

An apparatus for simultaneously extracting projection features of an image according to the present invention comprises a multiplier for optically multiplying an image of a character or any other figure whose projection features are to be extracted and for forming a plurality of optical images having a substantially identical shape, and a plurality of means for detecting various types of projection features upon detection of projections from the optical images having substantially the identical shape, wherein the plurality of optical images having substantially the identical shape and formed by the multiplier are independently supplied to the plurality of detecting means, and various types of projection features are simultaneously produced from the plurality of detecting means.

In the apparatus having the above arrangement according to the present invention, an image subjected to extraction of projection features is multiplied by the multiplier to obtain the plurality of optical images, and these images are simultaneously and independently supplied to the plurality of means for detecting various types of projection features. Therefore, the various types of projection features can be simultaneously obtained from the detecting means.

In the apparatus for simultaneously extracting projection features of an image, optical simultaneous processing is utilized to extract the features of the image, and then the arrangement is simplified at low cost. The time required for simultaneously extracting projection features can be shortened. In addition, various types of projection features can be easily obtained, as needed.

DETAILED DESCRIPTION OF THE PREFERRED EMBODIMENT

Figure 1:
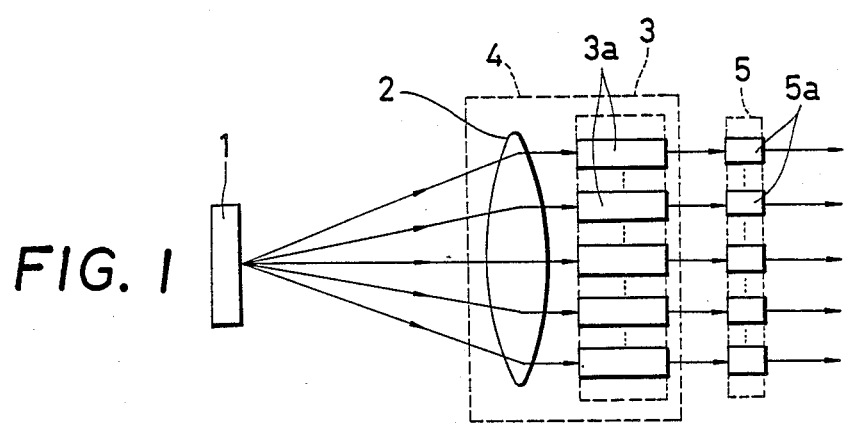
FIG. 1 is a schematic view of an apparatus for simultaneously extracting projection features of an image according to an embodiment of the present invention.

An embodiment for applying the present invention to an image recognition apparatus will be described with reference to the accompanying drawings.

FIGS. 1 to 5 show an embodiment of the present invention. In the same manner as in the conventional image recognition apparatus, an image pattern on an original is converted into image information by an image sensor. The image information is binarized and preprocessed, and the preprocessed information is stored in a memory as needed. The stored information is read out from the memory and displayed as an optical image on the screen of a display 1 comprising cathode ray tube or the like. The image on the screen is guided to a lens array 3 through a projection lens 2 spaced apart from the display 1 by a focal length of the lens 2.

A photosensor array 5 having a large number of projection photosensors 5a is arranged in front of the lens array 3. The lens array 3 comprises image formation lenses 3a located at positions respectively corresponding to the photosensors 5a. The optical image having substantially the same shape as that displayed on the screen of the display 1 is multiplied and formed on the respective light-receiving surfaces of the photosensors 5a by these image formation lenses 3a. The lens array 3 may comprise a planar microlens having microlenses (e.g., gradient index lenses) in a plate made of a glass or a synthetic resin. In this case, the number of microlenses such as gradient index lenses is the same as that of the photosensors 5a. An SLA (tradename) available from Nippon Sheet Glass Co., Ltd. may be used as the lens array 3. The SLA is obtained by bundling cylindrical gradient index lenses, the number of which is the same as that of photosensors 5a. In this case, a resin is filled between the cylindrical gradient index lenses such that they are located at the positions corresponding to the image formation lenses 3a.

The projection lens 2 and the lens array 3 constitute the multiplier 4. An image on the screen of the display 1 guided onto the lens array 3 through the projection lens 2 is multiplied and focused by the image formation lenses 3a of the lens array 3. The multiple images are respectively formed on the light-receiving surfaces of the projection photosensors 5a of the photosensor array 5. The number of projection photosensors 5a is appropriately determined according to the number of types of projection features to be extracted. The number of image formation lenses 3a is also determined according to the number of types of projection features to be extracted.

Electrical signals corresponding to the intensity distribution curves having specific projection features of images formed on the light-receiving surfaces of the projection photosensors 5a are output respectively from the photosensors 5a in a manner to be described later. In the same manner as in the conventional image recognition apparatus, the electrical signals are compared with the projection features of the standard pattern by an discrimination section, thereby electrically discriminating the image.

Various arrangements of a photosensor serving as the projection photosensors 5a shown in FIG. 1 will be described with reference to FIGS. 2A to 5. FIGS. 2A to 5 exemplify a case wherein Chinese character "✤" is displayed on the screen of the display 1. Therefore, Chinese character "✤" is also formed on the light-receiving surface of the photosensor 5a.

Figure 2A:
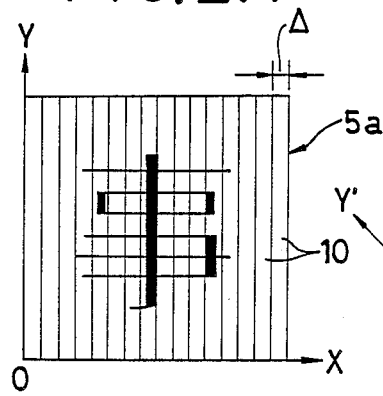
FIG. 2A is a front view of an X-axis projection photosensor used in the apparatus of FIG. 1.
Figure 2B:
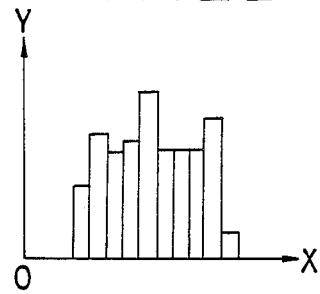
FIG. 2B is a graph showing an intensity distribution curve obtained from outputs from the X-axis projection photosensor shown in FIG. 2A.

The photosensor shown in FIG. 2A is designed to project an image on the X-axis. The photosensor consists of a large number of photosensor units 10 (16 units in FIG. 2A) each having a stripe-like light-receiving surface of a width Δ. The photosensor units 10 are aligned such that the sides thereof are adjacent to each other. The photosensor units 10 constitute a substantially square light-receiving surface. Electrical signals corresponding to the projection features are output from the photosensor units 10 according to the shape of the image formed on the light-receiving surface of the photosensor. The intensity distribution curve along the X-axis, as shown in FIG. 2B, can be obtained from these electrical signals.

Figure 3:
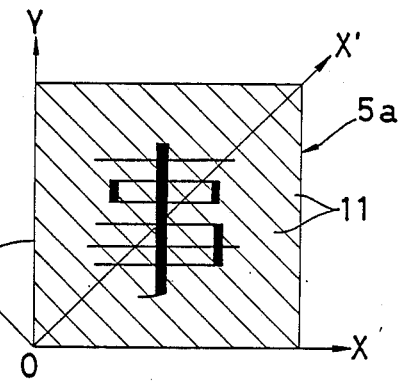
FIG. 3 is a front view of an X'-axis projection photosensor used in the apparatus of FIG. 1.

The photosensor shown in FIG. 3 has a pattern obtained by rotating the photosensor pattern of FIG. 2A through any angle θ about the origin. The photosensor shown in FIG. 3 consists of a large number of photosensor units 11 each having a stripe-like light-receiving surface having a width Δ in the same manner as in the photosensor of FIG. 2A. However, the photosensor in FIG. 3 is designed to project an image along the X'-axis obtained by rotating the X-axis through an angle θ. In this case, three types of photosensors each having an angle θ of 45°, 90° and 135° can be used. However, the angle θ may vary as needed.

Figure 4:
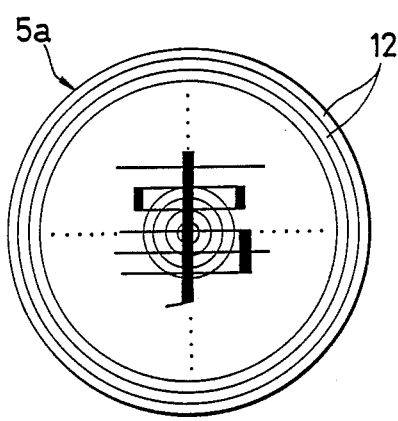
FIG. 4 is a front view of a circumferential projection photosensor used in the apparatus of FIG. 1.
Figure 5:
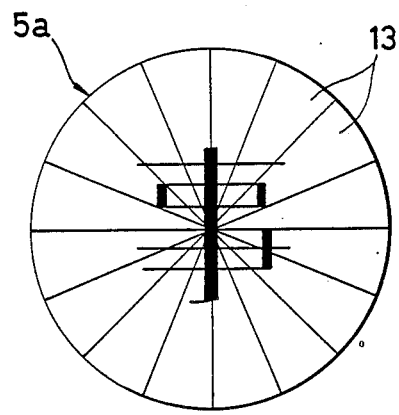
FIG. 5 is a front view of a radial projection photosensor used in the apparatus of FIG. 1.

Photosensors shown in FIGS. 4 and 5 are designed to perform nonlinear projection. More specifically, the photosensor in FIG. 4 is designed to perform circumferential projection and consists of a large number of concentric photosensor units 12 (16 units in this case). The central photosensor unit 12 has a circular light-receiving surface having a small diameter. The remaining photosensor units 12 are ring-like light-receiving surfaces having different diameters but substantially the same width. The width of these peripheral photosensor units 12 is substantially the same as the radius of the central photosensor unit 12. The photosensor units 12 are arranged such that the outer circumference of an inner unit serves as the inner circumference of an outer unit adjacent thereto. The photosensor units 12 constitutes a circle as a whole. In this photosensor, even if an image to be formed on the light-receiving surface is rotated, the intensity distribution curve free from the influence of rotation can be obtained. Therefore, projection features free from the influences of rotation can be extracted from an image.

A photosensor shown in FIG. 5 is designed to perform radial projection and consists of a large number of sector-shaped photosensor units 13 (16 units in this case) having substantially identically-shaped light-receiving surfaces. The photosensor units 13 are arranged around one point such that vertices of the central angles of the units 13 get together at the one point. In this state, the sides (radii) of the adjacent light-receiving surfaces are adjacent to each other to constitute a substantially circular light-receiving surface as a whole. In this sensor, even if an image focused on the light-receiving surface is deviated from the center, such a deviation does not influence the intensity distribution curve excessively. Therefore, projection features free from errors caused by the deviation of the image from the center can be extracted.

In the photosensors shown in FIGS. 2A to 5, a large number of photosensor units 10 to 13 can be arranged on a common substrate. In this case, transparent electrodes are normally formed on the substrate, so that a space between the adjacent two of the units 10 to 13 is preferably formed to prevent the electrodes from being electrically connected to each other.

Various modifications of the photosensors shown in FIGS. 2A to 5 may be made. For example, the shape and number of photosensor units 10 and 11 shown in FIGS. 2A and 3 may be changed to constitute a circular or rectangular light-receiving surface as a whole. Similarly, the shape and number of photosensor units 12 and 13 shown in FIGS. 4 and 5 may be changed to constitute a square or rectangular light-receiving surface as a whole. In this case, in the photosensor shown in FIG. 4, the central photosensor unit has a substantially square or rectangular shape, and the ring-like remaining photosensor units are replaced with substantially square or rectangular frame-like photosensor units. In this case, a substantially square or rectangular light-receiving surface can be obtained and the influences of rotation can be eliminated to some extent. In the photosensors shown in FIGS. 2A, 3 and 5, the photosensor units need not have the same shape. In the photosensors shown in FIGS. 2A, 3 and 4, the photosensor units need not have an identical width.

As is apparent from the above description, the photosensor array 5 includes various types of projection photosensors. For example, the array 5 includes one X-axis projection photosensor shown in FIG. 2A, three X'-axis projection photosensors having θ=45°, 90° and 135°, as shown in FIG. 3, one circumferential projection photosensor shown in FIG. 4, and one radial projection photosensor, i.e., a total of six projection photosensors. The light-receiving surface of each of these photosensors consists of a large number of photosensor units 10, 11, 12 or 13. Six intensity distribution curves having various projection features can be obtained from the electrical signals generated by these photosensor units 10 to 13.

Having described illustrative embodiments of the invention with reference to the accompanying drawings, it is to be understood that the invention is not limited to such precise embodiments, and that various changes and modifications may be effected therein by one skilled in the art without departing from the scope and spirit of the invention as defined in the appended claims.

Figure 6:
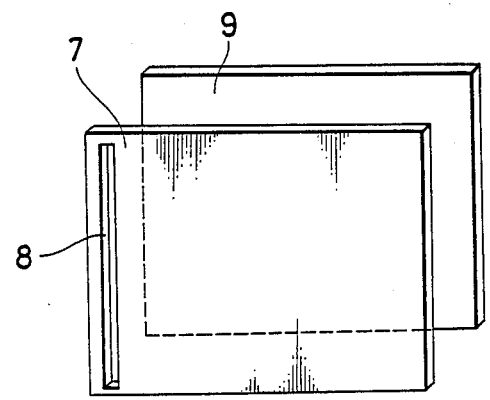
FIG. 6 is a schematic perspective view showing part of another arrangement of means for detecting projection on the X-axis.

In the embodiment described above, an arrangement, part of which is illustrated in FIG. 6, may be used as a means for detecting a projection feature, in place of the photosensors shown in FIGS. 2A to 5. In this case, each detecting means comprises a plurality of masks 7 respectively having projection slits 8 at different positions with respect to an optical image to be projected thereon, and single element sensors 9 arranged so as to correspond to the masks 7 respectively. The combination of the patterns of the projection slits 8 of the masks 7 in a means for detecting a projection feature is different from that of another means for detecting a projection feature. In this case, the multiple images formed by the multiplier are respectively projected on the light-receiving surfaces of the single element sensors through the projection slits of the masks.

The means for detecting a projection feature will be described in more detail with reference to FIG. 6. The means for detecting a projection feature comprises a large number of mask-sensor pairs each consisting of the mask having the projection slit 8 and the single element sensor 9 which has a single light-receiving surface and corresponds to the mask 7. Each projection slit 8 has a shape corresponding to one of the photosensor units 10 to 13 shown in FIGS. 2A to 5. Each single element sensor 9 may have the same shape as that of the mask 7 or is designed to have substantially the same shape as that of the slit 8 so as to correspond thereto. It is essential that a beam focused by the image formation lens 3a and passing through the slit 8 is substantially incident on the single element sensor 9.

The means for detecting a projection feature, part of which is illustrated in FIG. 6, is designed for projection on the X-axis, and a detailed arrangement thereof will be described below. The means for detecting a projection on the X-axis comprises 16 masks 7 each having a projection slit 8 having the shape corresponding to one of the 16 photosensor units 10 of FIG. 2A, and 16 single element sensors 9 arranged in one-to-one correspondence with the masks 7. The means for detecting projection on the X-axis comprises 16 mask-sensor pairs. The mask-sensor pairs are arranged in one-to-one correspondence with the image formation lenses 3a. The optical image on the screen of the display 1 is projected onto the light-receiving surface of the single element sensor 9 through the projection lens 2, the corresponding image formation lens 3a and the corresponding projection slit 8 of the mask 7.

The part of the means for detecting a projection on the X-axis is illustrated in FIG. 6. It is apparent that the photosensors shown in FIGS. 3 to 5 can be modified as described above. In this case, 16 mask-sensor pairs are required in place of the photosensors. Therefore, the number of the image formation lenses 3a to be arranged is 16 times the number of the lenses with the arrangement of FIG. 1. For example, a plurality of masks 7 of a means for detecting a projection feature, which corresponds to the one shown in FIG. 4, have a plurality of annular projection slits 8 whose diameters are sequentially changed. Each of the plurality of annular projections slits 8 formed on a plurality of masks 7 has inner and outer diameters such that the inner diameter serves as the outer diameter of the adjacent inner slit 8 and the outer diameter serves as the inner diameter of the adjacent outer slit 8 when the slits 8 overlap with respect to the optical image projected on the masks 7. Each of a plurality of masks 7 of the means for detecting a projection feature, which corresponds to the one shown in FIG. 5, has a substantially sector-shaped projection slit. The vertices of the central angles of the plurality of projection slits 8 respectively formed in the plurality of masks 7 get together at one point when the slits 8 overlap with respect to the optical image projected on the masks 7. At the same time, the shape and positions of the projection slits are selected such that they are sequentially arranged around the one point.

Referring to FIG. 6, a light condensing means may be used in place of the single element sensor 9. In this case, light passing through the projection slits 8 is condensed by the light condensing means, and thus an intensity distribution having a projection feature can be optically displayed. For example, a lens or prism which has as an end face a flat light-receiving surface having the same shape as one of the photosensor units 10 to 13 shown in FIGS. 2A to 5 can constitute the light condensing means. In this case, if the diameter of the lens or prism having the light-receiving surface is gradually decreased from one end (the light-receiving surface) to the other end, the beam received by the light-receiving surface can be focused to form a beam spot. Therefore, the intensity distribution can be optically displayed as an intensity distribution of beam spots.

In the above embodiment, the image pattern on the original is read by the image sensor, and the read image is displayed on the screen of the display 1. The displayed image is multiplied by the multiplier 4. However, the original may be directly placed at a position corresponding to the screen of the display 1, and the image pattern on the original may be directly multiplied by the multiplier 4.

In the above embodiment, a space is formed between the image formation lens 3a and the light-receiving surface of the photosensor 5a. However, if the image on the screen of the display 1 is formed at the end face (the light-receiving surface) of the photosensor 5a by the image formation lens 3a, the image formation lens 3a may be brought into direct contact with the light-receiving surface of the photosensor 5a.

What is claimed is:

1. An apparatus for simultaneously in parallel extracting projection features of an image, comprising:
    means for displaying an image whose projection features are to be extracted;
    a multiplier for optically multiplying the image and for forming a plurality of optical images having a substantially identical shape; and
    a plurality of means for detecting various types of projection features upon detection of projections from the optical images having substantially the identical shape;
    said multiplier comprising a single projection lens spaced apart from a displaying surface of said displaying means, and a plurality of small image formation lenses arranged in correspondence with said plurality of detecting means, said plurality of small image formation lenses being disposed in a planar arrangement between said single projection lens and said plurality of detecting means to form a lens array, said image formation lenses being adapted to form a plurality of pattern images each having an identical shape in vicinities of said plurality of detecting means upon reception of light from said projection lens;
    said plurality of detecting means at least including detecting means comprising a plurality of masks having projection slits formed at different positions with respect to the optical images to be projected thereon, and a plurality of single element sensing means, each of which has a single light-receiving surface and each of which respectively correspond to said masks, wherein each projection slit of said masks corresponds to one unit of one projection feature which should be extracted from an optical image, and a plurality of projection slits correspond to one of said projection features, and whereby the plurality of optical images formed by said multiplier are respectively projected onto said light-receiving surfaces of said plurality of single element sensing means through said projection slits of said masks;
    at least one of said plurality of detecting means comprising a plurality of masks having a plurality of stripe-like projection slits extending along a longitudinal direction, said longitudinally-extending stripe-like projection slits shaped and positioned such that their sides are adjacent to others of said longitudinally-extending stripe-like projection slits along a lateral direction when said longitudinally-extending stripe-like projection slits overlap each other with respect to optical images projected to the plurality of masks;
    at least another one of the plurality of detecting means comprising a plurality of masks having stripe-like projection slits extending along a lateral direction, said laterally-extending stripe-like projection slits shaped and positioned such that their sides are adjacent to others of said laterally-extending stripe-like projection slits along a longitudinal direction when said laterally-extending stripe-like projection slits overlap each other with respect to optical images projected to the plurality of masks; and
    at least still another one of the plurality of detecting means comprising a plurality of masks having stripe-like projection slits extending along an oblique direction, said obliquely-extending stripe-like projection slits shaped and positioned such that their sides are adjacent to others of said obliquely-extending stripe-like projection slits along a direction substantially at a right angle to said oblique direction when said obliquely-extending stripe-like projection slits overlap each other with respect to optical images projected tot he plurality of masks.

2. An apparatus according to claim 1, wherein at least one of the plurality of detecting means comprises a plurality of masks having annular projection slits whose diameters are sequentially changed, inner and outer diameters of said annular projection slits being adjacent to each other along a radial direction thereof when said annular projection slits are overlapped to each other with respect to optical images projected to the plurality of masks.

3. An apparatus according to claim 1, wherein at least one of the plurality of detecting means comprises a plurality of masks having substantially sector-shaped projection slits, a shape and positions of said sector-shaped projection slits being designed such that their vertices substantially get together at one point and sides of each of said sector-shaped projection slits are adjacent one thereof when said sector-shaped projection slits are overlapped to each other with respect to the optical image projected to the plurality of masks.

* * * * *

UNITED STATES PATENT AND TRADEMARK OFFICE
CERTIFICATE OF CORRECTION

PATENT NO.  : 4,947,449
DATED       : August 7, 1990
INVENTOR(S) : Norman A. Peppers, et. al.

It is certified that error appears in the above-identified patent and that said Letters Patent is hereby corrected as shown below:

Abstract, line 5, "image" should be plural --images--.

Column 9, line 2, "tot he" should be --to the --.

Signed and Sealed this

Fifteenth Day of December, 1992

Attest:

DOUGLAS B. COMER

*Attesting Officer*    *Acting Commissioner of Patents and Trademarks*